(12) United States Patent
Odame-Ankrah et al.

(10) Patent No.: US 11,820,655 B2
(45) Date of Patent: Nov. 21, 2023

(54) METHOD OF CONTROLLING RECOMBINATION OR BACK REACTIONS OF PRODUCTS AND BYPRODUCTS IN A DISSOCIATION REACTION

(71) Applicant: Global Analyzer Systems Limited, Calgary (CA)

(72) Inventors: Charles Anim Odame-Ankrah, Calgary (CA); Brian Wayne Rosentreter, Calgary (CA)

(73) Assignee: GLOBAL ANALYZER SYSTEMS LIMITED, Calgary (CA)

( * ) Notice: Subject to any disclaimer, the term of this patent is extended or adjusted under 35 U.S.C. 154(b) by 731 days.

(21) Appl. No.: 16/612,135

(22) PCT Filed: May 11, 2018

(86) PCT No.: PCT/CA2018/050561
§ 371 (c)(1),
(2) Date: Nov. 8, 2019

(87) PCT Pub. No.: WO2018/205033
PCT Pub. Date: Nov. 15, 2018

(65) Prior Publication Data
US 2020/0331755 A1 Oct. 22, 2020

Related U.S. Application Data

(60) Provisional application No. 62/504,852, filed on May 11, 2017.

(51) Int. Cl.
*C01B 21/24* (2006.01)
*B01J 19/12* (2006.01)
(Continued)

(52) U.S. Cl.
CPC ............. *C01B 21/24* (2013.01); *B01J 19/121* (2013.01); *B01J 19/123* (2013.01); *B01J 19/125* (2013.01);
(Continued)

(58) Field of Classification Search
CPC ....... C01B 21/24; B01J 19/121; B01J 19/123; B01J 19/125; B01J 19/126; B01J 19/127;
(Continued)

(56) References Cited

U.S. PATENT DOCUMENTS 3,800,159 A 3/1974 Lucas
3,840,342 A 10/1974 Neti et al.
(Continued)

FOREIGN PATENT DOCUMENTS

CN 1720443 A 1/2006
CN 101104954 A 1/2008
(Continued)

OTHER PUBLICATIONS

International Search Report dated Aug. 8, 2018 (Corresponding PCT Application No. PCT/CA2018/050561 / WO2018205033 ) (4 Pages).
(Continued)

*Primary Examiner* — Xiuyu Tai
(74) *Attorney, Agent, or Firm* — MBM Intellectual Property Law LLP

(57) ABSTRACT

The present invention provides a method of controlling back reactions or recombination reactions of product molecules formed in a dissociation reaction of reactant molecules of a fluid sample, in a reaction chamber. The method comprises introducing the fluid sample into the reaction chamber through one or more inlets, initiating the dissociation reaction of the reactant molecules of the fluid sample in the reaction chamber to form the product molecules, creating a
(Continued)

patterned flow of the fluid sample in the reaction chamber to reduce/minimize disordered and/or turbulent mixing of the reactant molecules and/or product molecules in the fluid sample, and conveying the fluid sample comprising the product molecules out from the reaction chamber through one or more outlets.

12 Claims, 9 Drawing Sheets

(51) Int. Cl.
 B01J 19/24 (2006.01)
 B01J 19/26 (2006.01)
(52) U.S. Cl.
 CPC ........... *B01J 19/126* (2013.01); *B01J 19/127* (2013.01); *B01J 19/128* (2013.01); *B01J 19/129* (2013.01); *B01J 19/2405* (2013.01); *B01J 19/26* (2013.01); *B01J 2219/0869* (2013.01); *B01J 2219/0875* (2013.01); *B01J 2219/0877* (2013.01); *B01J 2219/185* (2013.01); *B01J 2219/1943* (2013.01); *B01J 2219/1946* (2013.01)
(58) Field of Classification Search
 CPC .... B01J 19/128; B01J 19/129; B01J 19/2405; B01J 19/26; B01J 2219/0869; B01J 2219/0875; B01J 2219/0877; B01J 2219/185; B01J 2219/1943; B01J 2219/194; B01J 19/122; B01J 2219/1946; G01N 33/0037; G01N 31/005; G01N 21/76; G01N 21/631; G01N 2021/0325; G01N 21/05; G01N 31/10; B01D 53/56; B01D 53/74; B01D 2255/802; B01D 2257/404; B01D 2259/802
 See application file for complete search history.

(56) References Cited

U.S. PATENT DOCUMENTS

| | | | |
|---|---|---|---|
| 5,366,900 | A | 11/1994 | Conboy et al. |
| 5,587,069 | A | 12/1996 | Downey, Jr. |
| 5,906,946 | A | 5/1999 | Sausa et al. |
| 6,051,436 | A | 4/2000 | Reagen et al. |
| 6,346,419 | B1 | 2/2002 | Ryerson et al. |
| 7,238,328 | B2 | 7/2007 | Buhr |
| 2002/0137227 | A1 | 9/2002 | Weckstrom |
| 2002/0137228 | A1 | 9/2002 | Weckstrom |
| 2004/0108197 | A1 | 6/2004 | Buhr |
| 2004/0171846 | A1 | 9/2004 | Corrie et al. |
| 2007/0253871 | A1 | 11/2007 | Buhr |
| 2007/0253874 | A1 | 11/2007 | Foret |
| 2008/0165363 | A1 | 7/2008 | Gusev |
| 2008/0179178 | A1 | 7/2008 | Cabello et al. |
| 2010/0108489 | A1* | 5/2010 | Andersen ............... B01J 19/123 204/157.46 |
| 2011/0303532 | A1 | 12/2011 | Foret |
| 2014/0209573 | A1 | 7/2014 | Foret |
| 2014/0265044 | A1 | 9/2014 | Foret |

FOREIGN PATENT DOCUMENTS

| | | |
|---|---|---|
| CN | 101516770 A | 8/2009 |
| CN | 100588759 C | 2/2010 |
| CN | 102449473 A | 5/2012 |
| CN | 101365654 B | 9/2012 |
| CN | 102445415 B | 7/2013 |
| CN | 104071934 A | 10/2014 |
| EP | 1567849 A1 | 8/2005 |
| EP | 1377548 B1 | 2/2009 |
| JP | H09 145622 A | 6/1997 |
| JP | H10 45401 A | 2/1998 |
| JP | 4543186 B1 | 9/2010 |
| JP | 2010237192 A | 10/2010 |
| WO | 200249756 A1 | 6/2002 |
| WO | 2011160186 A1 | 12/2011 |
| WO | 2017173552 A1 | 10/2017 |
| WO | 2018205033 A1 | 11/2018 |

OTHER PUBLICATIONS

Written Opinion dated 2018266731 (Corresponding PCT Application No. PCT/CA2018/050561 / WO2018205033 ) (6 Pages).
Office Action dated Aug. 12, 2022 (Corresponding Australian Application No. 2018266731).
Office Action dated May 21, 2021 (Corresponding Chinese Application No. 201880046393.6).
Office Action dated Feb. 14, 2022 (Corresponding Chinese Application No. 201880046393.6).
Extended European Search Report dated Sep. 29, 2020 (Corresponding European Application No. 18798435.6.
Office Action dated Feb. 28, 2022 (Corresponding Indian Application No. 201927051251).
DeMore, W. B., et al., Chemical Kinetics and Photochemical Data for use in Stratospheric Modeling, NASA Jet Propulsion Laboratory, Pasadena, Calif., 1997.
Fehsenfeld, F. C., et al., Intercomparison of NO2 measurement techniques, Journal of Geophysical Research, 95, 3579-3597, 1990.
Fehsenfeld, F. C., et al., Ground-based intercomparison of nitric acid measurement techniques, Journal of Geophysical Research, 103, 3343-3353, 1998.
Kley, D. et al., Chemiluminescence detector for NO and NO2, Atmospheric Technology, 12, 63-69, 1980.
Ryerson, et al., Journal Geophys. Res., 10, 2000.
Mihelcic, D., et al., An improved method of measuring tropospheric NO2 and RO2 by matrix isolation and electron spin resonance, Journal of Atmospheric Chemistry, 3, 341-361, 1985.
Del Negro, L. A., et al., Comparison of modeled and observed values of NO2 and JNO2 during the Photochemistry of Ozone Loss in the Arctic Region in Summer (POLARIS) mission, Journal of Geophysical Research, 104, 26, 687-26, 703, 1999.
International Search Report dated Aug. 30, 2017 for WO 2017/173552.
Written Opinion dated Aug. 30, 2017 for WO 2017/173552.
Australian Office Action dated Aug. 14, 2020 for AU Application No. 2017245952.
Australian Office Action dated Apr. 21, 2021 for AU Application No. 2017245952.
Chinese Office Action dated Jul. 1, 2020 for CN Application No. 201780034858.1.
Chinese Office Action dated Jan. 15, 2021 for CN Application No. 201780034858.1.
Chinese Decision of Rejection dated Jun. 3, 2021 for CN Application No. 201780034858.1.
Chinese Office Action dated Dec. 1, 2021 for CN Application No. 201780034858.1.
Extended European Search Report dated Aug. 22, 2019 for EP17778525.0.
European Office Action dated Mar. 14, 2022 for EP Application No. 17778525.0.
Indian Office Action dated Oct. 28, 2020 for IN Application No. 201817041465.
U.S. Office Action dated Aug. 7, 2020 for U.S. Pat. No. 11,435,291.
U.S. Office Action dated Oct. 23, 2020 for U.S. Pat. No. 11,435,291.
U.S. Office Action dated Jul. 28, 2021 for U.S. Pat. No. 11,435,291.
U.S. Office Action dated Nov. 16, 2021 for U.S. Pat. No. 11,435,291.
U.S. Notice of Allowance dated Apr. 29, 2022 for U.S. Pat. No. 11,435,291.
Office Action dated Jan. 31, 2023 (Corresponding European Application No. 18798435.6).
Office Action dated Feb. 15, 2023 (Corresponding Canadian Application No. 3019481).

* cited by examiner

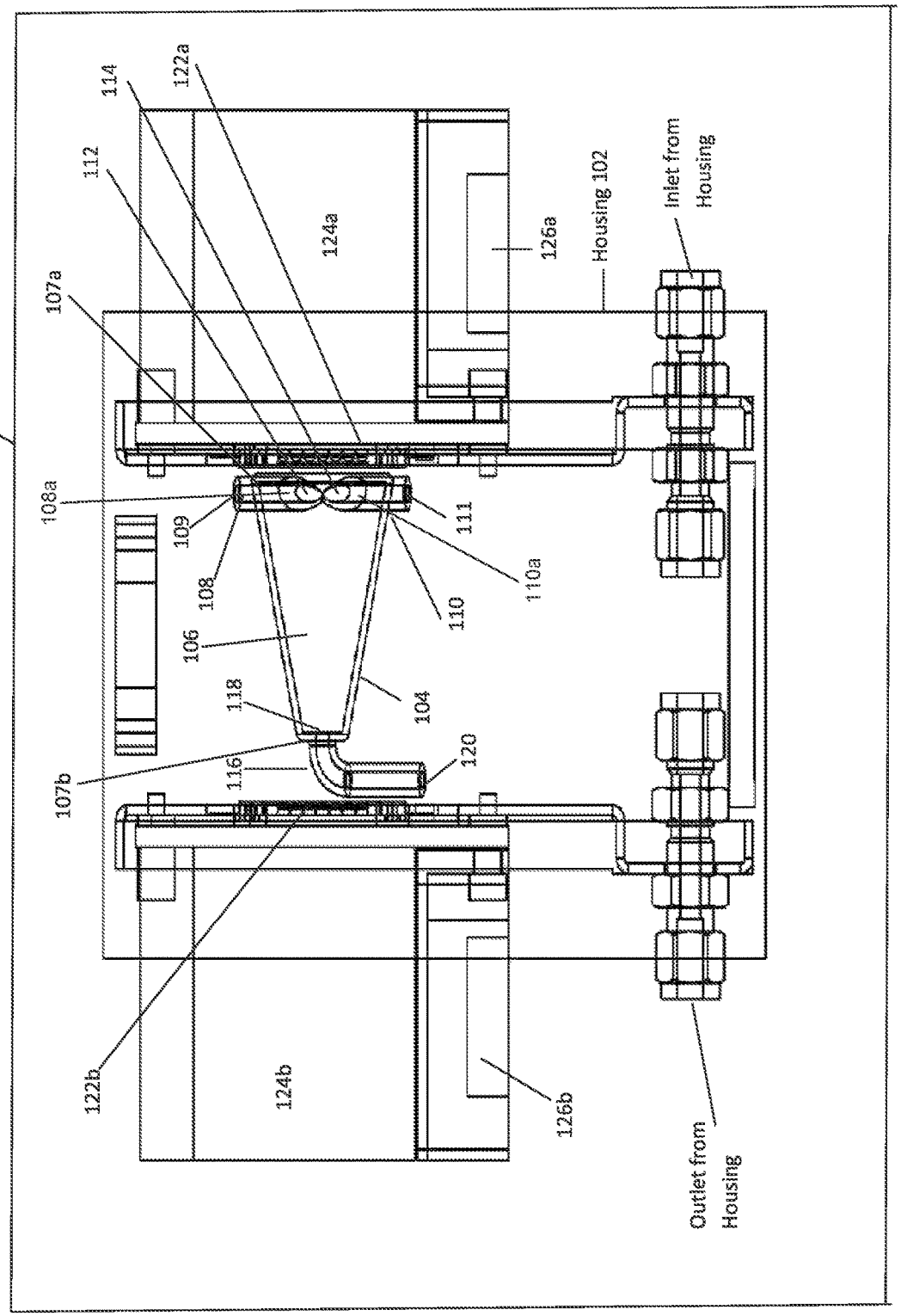

METHOD OF CONTROLLING RECOMBINATION OR BACK REACTIONS OF PRODUCTS AND BYPRODUCTS IN A DISSOCIATION REACTION

FIELD OF THE INVENTION

This invention generally relates to a method for indirectly measuring and/or transforming a quantity of a target molecule in a fluid sample, and more specifically relates to a method for reducing back reactions or recombination reactions of product and/or byproduct molecules obtained from a dissociation reaction of target molecules.

BACKGROUND

Photodissociation, photolysis, or photodecomposition is a chemical reaction in which a chemical compound is broken down by photons. It is defined as the interaction of one or more photons with one target molecule. Photodissociation is not limited to visible light. Any photon with sufficient energy can affect the chemical bonds of a chemical compound. Since a photon's energy is inversely proportional to its wavelength, electromagnetic waves with the energy of visible light or higher, such as ultraviolet light, x-rays and gamma rays are usually involved in such reactions.

Two reactive forms of nitrogen oxides, namely nitrogen dioxide ($NO_2$) and nitric oxide (NO) (together known as $NO_x$) are among several toxic gases emitted by combustion sources. $NO_2$ is a classified criteria pollutant known to be a major precursor for the production of the harmful secondary pollutant ozone ($O_3$), in the troposphere.

Accurate measurements of $NO_x$ are crucial for obtaining knowledge, to combat adverse effects of the pollutants, and to meet government regulations or help policy decisions. Various methods to measure the concentration of $NO_2$ in ambient air have been developed.

In general, $NO_2$ is photodissociated at ultraviolet (UV) wavelengths below 420 nm in the following first order process, $$NO_2 + h\nu \rightarrow NO + O \quad (1)$$

with the rate constant for photolysis given by j (units of $s^{-1}$), which is the wavelength-integrated product of the photon flux (photons $cm^{-2}s^{-1}$), the weakly temperature-dependent $NO_2$ absorption cross-section ($cm^2$ $molecule^{-1}$), and the quantum yield for photodissociation (molecules $photon^{-1}$) (DeMore, W. B., et al., Chemical Kinetics and Photochemical Data for use in Stratospheric Modeling, NASA Jet Propulsion Laboratory, Pasadena, Calif., 1997).

In air, the O atom formed in reaction (1) reacts rapidly with molecular oxygen ($O_2$) to form $O_3$, $$P + O_2 \rightarrow O_3 \quad (2)$$

which can then react with NO to re-form $NO_2$, $$NO + O_3 \rightarrow NO_2^* + O_2 \quad (3)$$

where $NO_2^*$ equals electronically excited $NO_2$. The $NO_2^*$ relaxes by giving off energy as shown in formula (4) in a principle called chemiluminescence, $$NO_2^* \rightarrow NO_2 + h\nu. \quad (4)$$

Efficient conversion of $NO_2$ to NO serves to maximize that difference and improve instrumental sensitivity for $NO_2$. The light given off from Reaction (4) is used to quantify the resulting product NO.

In ambient air, a possible interference species in $NO_2$ photolysis is glyoxal $(HCO)_2$ which absorbs light in the same $NO_2$ photolysis region (350-420 nm). Glyoxal at elevated levels has a negative interference on the measured NO concentration as illustrated in the reaction equations below.

$$(HCO)_2 + h\nu \rightarrow 2HCO^* \quad (5)$$

$$HCO^* + O_2 \rightarrow HO_2^* + CO \quad (6)$$

$$HO_2^* + NO \rightarrow OH^* + NO_2 \quad (7a)$$

$$RO_2^* + NO \rightarrow RO^* + NO_2 \quad (7b)$$

$$R-H + OH^* \rightarrow R^* + H_2O \quad (8)$$

$$R^* + O_2 \rightarrow RO_2^* \quad (9)$$

When glyoxal is present at elevated levels in the sample cell, it is photolyzed to produce formyl (HCO) radicals (eqn. 5). The HCO radicals react with molecular oxygen to form peroxyradicals, $HO_2$ (eqn. 6). The peroxyradicals, $HO_2$, or alkoxyradicals, $RO_2$, react with NO via a second order kinetic mechanism to form $NO_2$ (eqn. 7). More so, the OH radicals formed from equation 7a can initiate a second mechanism where alkyl radicals can be formed from hydrocarbons present in the sample stream. The alkyl radicals then react with molecular oxygen to generate peroxyradicals to re-activate equation 7. Although this leads to unintended reduction in the NO measurement, a well-designed photolysis chamber could minimize or prevent these side reactions from occurring (including the NO—$O_3$ recombination reactions discussed earlier). It is challenging to perfect such a system but through flow dynamics coupled with carefully selected wavelength and a novel chamber design, this can be achieved.

Conventionally, commercially available instruments used for measuring $NO_2$ in the atmosphere employ thermal catalysts for $NO_2$ conversion. These conventional devices, however, are not specific for $NO_2$. For example, one commercially available converter design is based on the reduction of $NO_2$ to NO on a heated substrate (i.e., thermal decomposition), such as molybdenum oxide, ferrous sulfate, and stainless steel. These surface-based converters are not specific for $NO_2$, as they also efficiently reduce other atmospheric nitrogen-containing compounds to a detectable form. (Fehsenfeld, F. C., et al., Intercomparison of $NO_2$ measurement techniques, Journal of Geophysical Research, 95, 3579-3597, 1990; Fehsenfeld, F. C., et al., Ground-based intercomparison of nitric acid measurement techniques, Journal of Geophysical Research, 103, 3343-3353, 1998).

Molybdenum oxide is the most commonly used thermal substrate. Use of molybdenum converters in chemiluminescent analyzers can result in a gross overestimate of ambient $NO_2$, as it converts more than just $NO_2$ to NO. Compounds such as $NO_3$ and $N_2O_5$, Peroxyacylnitrates (PANs), alkylnitrates (ANs), and other oxidized nitrogen oxides (which are generally known as $NO_z$) can also be converted into NO when present in the sampled air mass. Because of this, the '$NO_x$' readings can and will be overestimated when these compounds are present in significant levels. The '$NO_x$' measurement read by the chemiluminescent analyzer is now a measurement of $NO_y$, which is the sum of $NO_x$ and other reactive nitrogen compounds. The resultant '$NO_x$' reading causes the chemiluminescent analyzer to overestimate $NO_2$ readings. Knowing the precise amount of $NO_2$ is important, as it determines how much ozone is being created in the troposphere which is of the utmost importance to the environmental science community.

Moreover, the Molybdenum converter is not effective in all process conditions even if the listed $NO_z$ compounds are absent, as it can also be affected by ammonia ($NH_3$), nitric acid ($HNO_3$), and water. These products deposit onto the converter's surface, preventing effective conversion (of $NO_2$ to NO) from occurring and causing uncertainty in the readings on the analyzer. Finally, the Molybdenum catalyst must be heated to 300° C.-350° C. to convert $NO_2$ to NO. The above illustrates the increased maintenance and operational costs for the analyzer, as the Molybdenum will need to be replaced more frequently.

Another technique, the photolytic dissociation of $NO_2$ with UV light followed by chemiluminescence detection of the product NO, has been employed for ambient measurements of $NO_2$ for over two decades. (Kley, D. et al., Chemiluminescence detector for NO and $NO_2$, Atmospheric Technology, 12, 63-69, 1980; Ryerson, et al., Journal Geophys. Res., 10, 2000.) This broadband photolysis technique has provided field measurement data used to evaluate and improve the current understanding of tropospheric and stratospheric ozone chemistry, radiative transfer, and sources and fate of reactive nitrogen compounds. The photolysis-chemiluminescence (P-CL) technique has been compared to other $NO_2$ measurement techniques on the ground (Mihelcic, D., et al., An improved method of measuring tropospheric $NO_2$ and $RO_2$ by matrix isolation and electron spin resonance, *Journal of Atmospheric Chemistry*, 3, 341-361, 1985; Fehsenfeld et al., 1990) and aboard aircraft (Del Negro, L. A., et al., Comparison of modeled and observed values of $NO_2$ and $J_{NO2}$ during the Photochemistry of Ozone Loss in the Arctic Region in Summer (POLARIS) mission, *Journal of Geophysical Research*, 104, 26, 687-26, 703, 1999). It has been shown to provide useful data over a wide range of concentrations and ambient environments, and has a fast start up and integration time. It also results in greater specificity for $NO_2$, but is hampered by relatively low conversion efficiency and detrimental effects of using the broadband light sources typically employed (e.g., high-pressure mercury lamp, xenon arc lamp, mercury arc lamp).

The detrimental effects are largely based on the broad spectrum of light applied to the sample. The sources that produce significant radiation in the infrared (>1000 nm) result in heat being added to the air sample, which in turn resulted in thermal conversion of labile compounds such as PANs and ANs. The broadband sources also emit radiation in the UV at both shorter and longer wavelengths than useful for $NO_2$ conversion, often resulting in photolytic conversion of interfering species (e.g., $HNO_3$ and the halogen nitrates at wavelengths less than 350 nm).

The relatively low conversion efficiency afforded by the conventional photolytic methods has typically been compensated for by allowing for longer residence time in the photolysis chamber. This practice further complicates the conversion by allowing for back reaction of the NO produced with ambient ozone. Ideally, the photolysis would take place in one second or less to minimize the effects of the back reaction.

In addition, the existing photolysis-based methods have not seen widespread use because of the operating costs associated with replacement of the relatively short-lived light sources (typically 200-1500 hours of continuous operation depending on the lamp, with costs ranging from $200-$900 per lamp). Replacing these lamps also equates to man hours spent and instrument downtime incurred, both adding costs to the testing procedure. In addition to these costs, additional costs of prior methods include the mechanical shuttering devices, filters, broadband light source power requirements and elaborate positioning devices employed to position the broadband light source.

U.S. Pat. No. 7,238,328 discloses a solid-state light source photolytic $NO_2$ converter including a reaction chamber made of a reflective material with diffuse reflective properties, whereby the reaction chamber includes a low volume gas cell wherein the gas sample residence time is less than 5 seconds is provided to avoid unwanted side reactions of $NO_2$ and NO. The converter and method described in this patent also suffer from low conversion efficiency at reduced pressures and limited range as the converter disclosed therein cannot measure higher than 2-4 ppm of $NO_2$. In addition, the converter loses conversion efficiency when operating in a reduced pressure system, making its integration into an existing analyzer even more difficult.

JP 4543186 discloses an apparatus and a chemiluminescence method for measuring nitrogen oxide concentration, wherein the apparatus is configured to have ultraviolet light source as part of the converter main body. The apparatus of this reference would also suffer with similar problems as that of U.S. Pat. No. 7,238,328, for example the reaction chamber configuration would allow for recombination reactions to occur before the NO leaves the chamber. In addition, this patent does not address the range at which they can operate, nor if the converter has a linear conversion of $NO_2$ to NO as the concentration of $NO_2$ increases.

Therefore, a need exists to provide a system and a method, which can reduce or minimize interference from product and/or byproduct molecules obtained in a dissociation reaction of a reactant molecules, thereby improving conversion efficiency.

SUMMARY OF THE INVENTION

Numerous other features, objects and advantages of the invention will become apparent from the following description when read in conjunction with the accompanying drawings.

In accordance with an aspect of the present invention, there is provided a method of controlling recombination or back reactions of product molecules and/or byproduct molecules in a dissociation reaction.

In accordance with an aspect of the present invention, there is provided a method of controlling back reactions or recombination reactions of product molecules formed in a dissociation reaction of reactant molecules of a fluid sample, in a reaction chamber. The method comprises the steps of introducing the fluid sample into the reaction chamber through one or more inlets; initiating the dissociation reaction of the reactant molecules of the fluid sample in the reaction chamber to form the product molecules; creating a patterned flow of the fluid sample in the reaction chamber to reduce/minimize disordered and/or turbulent mixing of the reactants and/or products in the fluid sample; and conveying the fluid sample comprising the product molecules out from the reaction chamber through one or more outlets.

In accordance with an aspect of the present invention, there is provided a converter for a dissociation reaction of reactant molecules in a fluid sample. The converter comprises a converter body defining a reaction chamber and having a central axis; one or more energy sources in communication with the reaction chamber for dissociating the reactant molecules in the fluid sample; one or more inflow conduits for conveying the fluid sample into the reaction chamber, the inflow conduit having an inlet configured to be in fluid communication with a source of the fluid sample and an outlet in communication with the reaction chamber, wherein the fluid sample enters the inlet of the inflow conduit as an unprocessed fluid sample; and one or more outflow conduits for conveying the fluid sample out of the reaction chamber, the outflow conduit having an inlet in fluid communication with the reaction chamber and an outlet configured to be in fluid communication with a receptacle for receiving the fluid sample, wherein the fluid sample exits the outflow conduit as a processed fluid sample; wherein the one or more inflow conduits are oriented tangentially with respect to the converter body; and wherein at least the portion of the one or more outflow conduits extending from the inlet is oriented axially with respect to the converter body.

In one embodiment of the converter, the one or more inflow conduits are oriented tangentially with respect to the converter body; and wherein the one or more outflow conduits are oriented axially with respect to the converter body.

In accordance with an aspect of the present invention, there is provided a method of controlling back reactions or recombination reactions of product molecules formed in a dissociation reaction of reactant molecules of a fluid sample. The method comprises providing a converter as described herein; introducing the fluid sample into the reaction chamber through one or more inflow conduits; initiating the dissociation reaction of the reactant molecules of the fluid sample in the reaction chamber to form the product molecules, through exposure of the fluid sample to energy from an energy source; creating a patterned flow of the fluid sample in the reaction chamber and/or when the fluid sample is in the outflow conduit to reduce disordered and/or turbulent mixing of the reactant molecules and product molecules in the fluid sample; and conveying the fluid sample comprising the product molecules out from the reaction chamber through one or more outflow conduits.

BRIEF DESCRIPTION OF THE DRAWINGS

FIG. 9 is a top view of an embodiment of a photolytic converter in accordance with the present invention, comprising a converter body enclosed in a housing provided with electromagnetic radiation sources, and heat dissipation equipment attached to the housing.

DETAILED DESCRIPTION

Definitions

Figure 1:
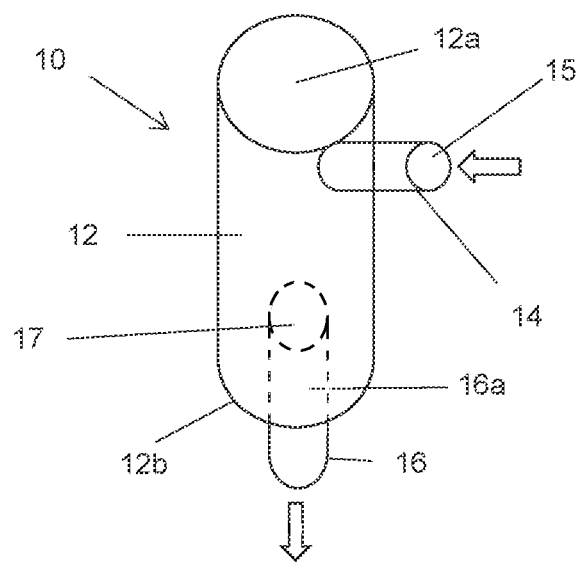
FIG. 1 illustrates a converter body in accordance with an embodiment of the photolytic converter of present invention.

Unless defined otherwise, all technical and scientific terms used herein have the same meaning as commonly understood by one of ordinary skill in the art to which this invention belongs.

As used herein, the term "electromagnetic radiation" includes radio waves, microwaves, infrared radiation, visible light, ultraviolet radiation, X-rays and gamma rays.

As used herein, the term "UV" refers to ultraviolet radiation in the region of electromagnetic spectrum including wavelengths from 40 to 4000 Å (4 to 400 nm).

As used herein, the term "chemiluminescence" refers to the emission of absorbed energy (as light) due to a chemical reaction of the components of the system. Chemiluminescence occurs in thousands of chemical reactions covering a wide variety of compounds, both organic and inorganic.

As used herein, the term "quantum yield" for a photochemical reaction refers to the number of moles of a stated reactant disappearing, or the number of moles of a stated product produced, per unit of light of the stated wavelength absorbed. Quantum yield also means the number of photon-induced reactions of a specified type per photon absorbed. Photolytic and photolysis means the use of radiant energy to produce chemical changes. Photolytic and photolysis also means decomposition of a compound into simpler units as a result of absorbing one or more quanta of radiation. Absorption cross-section means the ratio of the amount of power removed from a beam by absorption of radio energy by a target to the power in the beam incident upon the target.

As used herein, the term "solid-state light source" refers to a diode in which a semiconductor material produces either the spectrally coherent output beam (diode laser), or a narrow range of wavelengths (LED—typically full width at half maximum=5-20 nm).

As used herein, the term "fluid" refers to a substance, as a liquid or gas.

As used herein, the term "about" refers to approximately a +/−10% variation from a given value. It is to be understood that such a variation is always included in any given value provided herein, whether or not it is specifically referred to.

In accordance with an aspect of the present invention, there is provided a method of controlling back reactions or recombination reactions of product and by product molecules formed in a dissociation reaction of reactant molecules of a fluid sample in a reaction chamber. The method of the present invention comprises introducing the fluid sample into the reaction chamber through one or more inlets, and initiating the dissociation reaction of the reactant molecules of the fluid sample in the reaction chamber to form the product molecules, creating a patterned flow of the fluid sample in the reaction chamber and/or when the fluid sample is moving towards the one or more outlets to reduce/minimize disordered and/or turbulent mixing of the reactants and/or products in the fluid sample, and conveying the fluid sample comprising the product molecules out from the reaction chamber through one or more outlets.

The dissociation reaction in the reaction chamber can be initiated by exposing the fluid sample to an energy source capable of dissociating the target reactant molecules. Non limiting examples of such energy sources are light or radiations of a specific wavelength, heat, etc.

During the transfer of energy to the process, the fluid sample flow is directed through the chamber in a manner that creates a patterned flow which reduces/minimizes disordered and/or turbulent mixing of the reactants and/or products in the fluid sample, which in turn can reduce and/or prevent the recombination of the product molecules and/or byproduct molecules among themselves and/or with reactant molecules in the fluid sample.

Non limiting examples of the patterned flow include ordered flow such as linear flow, plug flow, stratified flow or a combination thereof, and/or helical flow such as cyclonic or vortex flow.

The patterned flow of the fluid sample can be achieved via appropriate shape and/or configuration of the reaction chamber and/or specific placement and/or configuration of the inlets and outlets associated with the reaction chamber.

Helical flow of the fluid sample can be created by orienting the one or more inlets tangentially with respect to the reaction chamber and orienting the one or more outlets axially with respect to the reaction chamber.

An ordered flow of the fluid sample can be achieved by providing one or more inflow conduits and/or one or more outflow conduits in communication with the reaction chamber, and extending at least a portion of the one or more inflow conduits and/or the outflow conduits parallel to a longitudinal axis of the reaction chamber. In some embodiments, the inflow and/or the outflow conduit extends parallel to a transverse axis of the reaction chamber.

In some embodiments, an ordered flow of the fluid sample can be achieved with the use of one or more inflow and/or out flow conduits extending into the reaction chamber. In such embodiments, the inflow and/or the outflow conduit(s) have a portion extending parallel to a longitudinal axis of the converter body, and/or a portion extending parallel to a transverse axis of the reaction chamber. In some embodiments the inflow and/or the outflow conduit(s) have a portion extending at an angle relative to the longitudinal and/or transverse axis of the reaction chamber.

It is believed that the patterned flow of the fluid sample in the reaction chamber reduces/minimizes disordered and/or turbulent mixing of the reactants and products in the fluid sample, which reduces the amount of molecular collisions per unit area within the reaction chamber, thereby reducing the back reactions/recombination reactions of the product and/or byproduct molecules and/or reactant molecules.

In some embodiments, the method further comprises conveying the fluid sample comprising products and by-products into a detector means through outflow conduit for generating a signal indicative of a concentration of the product molecules in the processed gas sample.

In some embodiments of the method, the dissociation reaction is a photolytic dissociation reaction.

In some embodiments of the method, the dissociation reaction is a thermal dissociation reaction.

In some embodiments of the method, the patterned flow is created while the fluid sample is entering the reaction chamber and/or when the fluid sample is undergoing the dissociation reaction.

In some embodiments of the method, patterned flow is created while the fluid sample is moving toward the outlet and being conveyed out of the reaction chamber, which in turn induces a patterned flow in the reaction chamber.

In accordance with another aspect of the present invention, there is provided a converter for a dissociation reaction of reactant molecules in a fluid sample. The converter comprises a converter body defining a reaction chamber and having a central axis. One or more energy sources are provided in communication with the reaction chamber for dissociating the reactant molecules in the fluid sample. The converter further comprises one or more inflow conduits for conveying the fluid sample into the reaction chamber, and one or more outflow conduits for conveying the fluid sample out of the reaction chamber. The one or more inflow conduits each have an inlet configured to be in fluid communication with a source of the fluid sample and an outlet in communication with the reaction chamber, wherein the fluid sample enters the inlet of the inflow conduit as an unprocessed fluid sample. The one or more outflow conduits each have an inlet in fluid communication with the reaction chamber and an outlet configured to be in fluid communication with a receptacle for receiving the fluid sample, wherein the fluid sample exits the outflow conduit as a processed fluid sample.

In some embodiments, the one or more inflow conduits are oriented tangentially with respect to the converter body; the one or more outflow conduits are oriented in a manner, such that at least the portion of the one or more outflow conduits extending from the inlet is oriented axially with respect to the converter body. In some embodiments, the outflow conduit can optionally extend into the reaction chamber.

The converter body can be elongated, square, rectangular, circular, conical, oblong, elliptical or partially elliptical, etc.

In some embodiments, converter body is conical.

In some embodiments, the one or more inflow conduits and/or one or more outflow conduits are oriented such that at least a portion of the one or more inflow conduits and/or the outflow conduits runs parallel to a longitudinal axis of the reaction chamber. In these embodiments the inflow and/or outflow conduits can optionally extend into the converter body.

In some embodiments, the one or more outflow conduits have a portion extending parallel to the longitudinal axis of the converter body.

The one or more energy sources for the dissociation of the reactant molecules in the fluid sample can be provided outside or inside the converter body.

In some embodiments, the one or more dissociation reaction energy sources are provided outside the converter body, and the converter body is provided with one or more corresponding communication regions provided in the converter body, thereby allowing exposure of the radiation from the one or more electromagnetic radiation sources to the fluid sample in the reaction chamber.

In some embodiments, the one or more communication regions are provided at one end and/or one side of the converter body. In some embodiments, the one or more communication regions are provided at opposite ends and/or opposite sides of the converter body.

The diameter of the conduits(s) can be selected to achieve and/or control a desired speed for fluid flow. For example, the diameter of the conduit(s) can be about 3 mm to about 15 mm depending upon the length of the conduit and the length and/or width of the reaction chamber.

In some embodiments, the diameter of the outflow conduit is ¼ inch to about ⅛ inch.

In some embodiments, the converter further comprises a structural aid within the reaction chamber, or placed before or after the reaction chamber that encourages the patterned flow. In some embodiments, the structural aid is helical (solid and/or finned) surface that induces spiral or helical flow.

In some embodiments of the present invention, the converter is a photolytic converter comprising a converter body defining a reaction chamber, and having an inner surface and an outer surface, wherein the reaction chamber optionally has reflective properties. One or more electromagnetic radiation sources are placed in communication with the reaction chamber for transmitting the electromagnetic radiation into the reaction chamber for photolytically dissociating the reactant molecules in the fluid sample to form the product molecules. The photolytic converter further comprises one or more inflow conduits for conveying the fluid sample into the reaction chamber, and one or more outflow conduits for conveying the fluid sample out of the reaction chamber. The one or more inflow conduits have an inlet in fluid communication with a source of the fluid sample and an outlet in communication with the reaction chamber, wherein the fluid sample enters the inlet of the inflow conduit(s) as an unprocessed fluid sample. The outflow conduit(s) have an inlet in fluid communication with the reaction chamber and an outlet in fluid communication with a receptacle for receiving the fluid sample, which exits the outflow conduit as a processed fluid sample.

In some embodiments of the photolytic converter, the one or more inflow conduits are oriented tangentially with respect to the converter body; the one or more outflow conduits are oriented in a manner, such that at least the portion of the one or more outflow conduits extending from the inlet is oriented axially with respect to the converter body. In these embodiments the outflow conduit can optionally extend into the reaction chamber.

In some embodiments, the one or more inflow conduits and/or one or more outflow conduits are oriented such that at least a portion of the one or more inflow conduits and/or the outflow conduits runs parallel to a longitudinal axis of the converter body. In these embodiments the inflow and/or outflow conduits can optionally extend into the reaction chamber.

In some embodiments, the one or more outflow conduits have a portion extending parallel to the longitudinal axis of the reaction chamber.

The conduit(s) extending in to the reaction chamber can be transparent, translucent and/or opaque.

The conduit(s) can extend in any direction within the reaction chamber.

In some embodiments, the conduit(s) extending into the reaction chamber extend(s) in a direction parallel to, orthogonal to and/or at an angle relative to the propagation of the electromagnetic radiation within the chamber.

In some embodiments, the conduit(s) extending into the reaction chamber has a portion extending in a direction parallel to the propagation of the electromagnetic radiations within the chamber, and has a portion extending in a direction orthogonal to the propagation of the electromagnetic radiation within the chamber.

In some embodiments, the inflow and/or the outflow conduit(s) has a portion extending parallel to the longitudinal axis of the converter body and a portion extending parallel to the transverse axis of the converter body.

The conduit(s) extending into the reaction chamber has a length within the reaction chamber sufficient to provide a confined path for the flow of the fluid sample into the reaction chamber (thereby to achieve a defined flow of the fluid sample into reaction chamber) or to provide a confined path for the flow of the fluid sample out of the reaction chamber (thereby to achieve a defined flow of the processed fluid sample out of the reaction chamber). For example, the length of the inflow conduit within the reaction chamber is configured to achieve a defined flow of the fluid sample into the reaction chamber, and the length of the outflow conduit within the reaction chamber is configured to achieve a defined flow of the fluid sample out of the reaction chamber. Further details about the conduits extending into the reaction chamber is provided in the Applicant's co-pending PCT Publication No. WO 2017/173552, incorporated herein by reference.

The one or more electromagnetic sources can be placed outside or inside the converter body.

In some embodiments, the one or more electromagnetic radiation sources are provided outside the converter body, and the converter body is provided with one or more corresponding communication regions provided in the converter body, thereby allowing exposure of the radiation from the one or more electromagnetic radiation sources to the fluid sample in the reaction chamber.

In some embodiments, the one or more communication regions are provided at one end and/or one side of the converter body. In some embodiments, the one or more communication regions are provided at opposite ends and/or opposite sides of the converter body.

In some embodiments, the one or more communication regions are one or more transparent windows provided on the converter body, thereby allowing exposure of the radiation from the one or more electromagnetic radiation sources to the fluid sample in the reaction chamber.

In some embodiments, the photolytic converter of the present invention comprises a housing enclosing the converter body, and the electromagnetic radiation sources are provided in the housing and in communication with the one or more communication regions provided in the converter body. In some embodiments, the housing has structural components that hold the electromagnetic radiation sources. In some embodiments, the electromagnetic radiation sources are integrated directly into the housing.

In some embodiments, the one or more electromagnetic radiation sources are integrated in the body or are placed within the body, such that the radiation sources are in direct contact with the fluid sample. In some embodiments, the electromagnetic radiation source is located at one end and/or one side of the body. In some embodiments, the one or more electromagnetic radiation sources are located at opposite ends and/or opposite sides of the converter body.

In some embodiments, where the electromagnetic radiation source(s) are integrated with the converter body or placed within the converter body, the converter body has one or more open ends/sides to allow contact with the electromagnetic source(s) and/or an independent housing with the electromagnetic source(s) attached to it, and has an air tight seal with the electromagnetic sources and/or the independent housing, such as described in JP 4543186, incorporated herein by reference.

In some embodiments, the one or more electromagnetic radiation sources are located at two opposite ends of the converter body.

In some embodiments, the electromagnetic radiation sources are located around the outside of the converter body. In embodiments where the reaction chamber is cylindrical, the electromagnetic radiation sources may be located circumferentially around the converter body.

In some embodiments, the outlet(s) of the inflow conduit(s) and/or the inlet(s) of the outflow conduit(s) are disposed in close proximity to the portion of the reaction chamber, which is in communication with the one or more electromagnetic radiation sources. In some embodiments, the outlet(s) of the inflow conduit(s) and/or the inlet(s) of the outflow conduit is adjacent the portion of the reaction chamber, which is in communication with the one or more electromagnetic radiation sources.

The converter body can be made of any material. The material can be reflective, transparent, translucent and/or opaque to electromagnetic radiation.

The converter body can be created through means of forming the material into the desired converter shape (e.g. welding, glass blowing, machining, carving, extruding), or hollowing/carving out the converter shape from a solid piece of material.

In some embodiments, the converter body is made from a solid piece of material (metal, plastic, glass, etc.). The space inside of the chamber becomes the space created from the act of hollowing out the piece of material. In some embodiments, the metal is aluminum, and/or steel.

In some embodiments, the converter body is made of glass (e.g. quartz, borosilicate, etc.). In some embodiments the converter body is made of metal (e.g. aluminum, steel, stainless steel, etc.).

The reflective properties of the reaction chamber can be derived from the material the converter body is made of, and/or by covering and/or coating the inner surface and/or the outer surface of the converter body with a material having reflective properties and/or electromagnetic radiation reflective properties.

In some embodiments, the converter body is made of electromagnetic radiation reflective material. In such cases the inner surface and/or the outer surface of the converter body has reflective properties. In some embodiments, the convert body is made of material transparent to electromagnetic radiation. In such cases the inner and/or the outer surface of the converter body can be covered or coated with a material having reflective properties and/or electromagnetic radiation reflective properties, which could be specular and/or diffuse reflective properties. In some embodiments, the converter body can be made of a material translucent and/or opaque to electromagnetic radiation. In such cases the inner surface of the converter body can be covered or coated with a material having reflective properties.

In some embodiments, the inner surface and/or outer surface of the converter body is coated with a reflective coating having specular or diffusive reflector properties.

In some embodiments, the inner surface and/or outer surface of the converter body is coated with a reflective coating comprising material having specular reflector properties, such as Krylon® mirror glass spray, Rust-Oleum Specialty® mirror effect spray, and/or thin film UV elliptical coatings In some embodiments, the inner surface and/or outer surface of the converter body is coated with a reflective coating comprising material having diffuse reflector properties, such as Teflon™ or barium sulfate ($BaSO_4$). Teflon™ means polytetrafluoroethylene (PTFE) fluorocarbon polymers available as molding and extrusion powders, aqueous dispersion, film, finishes, and multifilament yarn or fiber, and/or thin film UV diffuse reflective coatings.

In some embodiments the inner surface and/or outer surface of the converter body is covered with a material having reflective properties, such as aluminum foil.

In some embodiments the converter body is made of glass, which is covered or coated with a reflective material, while leaving certain portions uncovered or uncoated to provide one more transparent windows to allow transmission of electromagnetic radiations. In some embodiments the converter body is made of quartz.

In some embodiments, the inner surface and/or outer surface of the converter body or material that is covering the converter body has specular and/or diffusive reflective properties. Specular reflector means a reflecting surface (polished metal or silvered glass) that gives a direct image of the source, with the angle of reflection equal to the angle of incidence. A specular reflector is also known as regular reflector or specular surface and it produces a direct reflection, mirror reflection or regular reflection. Diffuse reflector means any surface whose irregularities are so large compared to the wavelength of the incident radiation that the reflected rays are sent back in a multiplicity of directions.

In some embodiments, the converter body is made of glass (such as quartz), which is covered or coated with a reflective material, while leaving certain portions uncovered or uncoated to provide one more transparent windows to allow transmission of electromagnetic radiations. In some embodiments the converter body is covered with aluminum and/or aluminum foil.

The conduits of the converter of the present invention can be configured to convey the unprocessed fluid sample and the processed fluid sample into and from the reaction chamber, respectively, at a desired pressure.

In some embodiments, the inflow conduit is connected to a pressure regulator to convey the unprocessed fluid sample at a pressure lower than the pressure of the reaction chamber, and the outflow conduit is connected to a pressure regulator to convey the processed fluid sample at a pressure higher than the pressure of the reaction chamber.

In some embodiments, the inflow conduit is connected to a pressure regulator to convey the unprocessed fluid sample at a pressure higher than the pressure of the reaction chamber, and the outflow conduit is connected to a pressure regulator to convey the processed fluid sample at a pressure lower than the pressure of the reaction chamber.

In some embodiments, the inflow conduit is connected to a pressure regulator to convey the unprocessed fluid sample at a pressure higher than the pressure of the reaction chamber and the outflow conduit is connected to a pressure regulator to convey the processed fluid sample at a pressure higher than the pressure of the reaction chamber.

In some embodiments, the inflow conduit is connected to a pressure regulator to convey the unprocessed fluid sample at a pressure lower than the pressure of the reaction chamber, and the outflow conduit is connected to a pressure regulator to convey the processed fluid sample at a pressure lower than the pressure of the reaction chamber.

In some embodiments, the reaction chamber of the converter of the present invention is able to withstand pressure in the range of 170 mmHg (abs) to 1000 mmHg (abs).

In some embodiments of the photolytic converter of the present invention, the residence time of the fluid sample in the photolytic converter can be up to 10 seconds by modifying the volume of the reaction chamber and/or the shape of the reaction chamber. In one embodiment, the resident time of up to 10 seconds is achieved by using a pressure regulator and/or a flow controller.

The photolytic converter of the present invention can be used with any electromagnetic radiation source, such as light-emitting diode (LED), LASER, xenon arc lamp, etc.

In some embodiments, the electromagnetic radiation source is configured to produce UV and near UV wavelength radiation in the range of 351-415 nm In some embodiments, the electromagnetic radiation source is a source of radio waves, microwaves, infrared radiation, visible light, ultraviolet radiation, X-rays or gamma rays.

In some embodiments, the receptacle comprises a detector member in communication with the outlet of the outflow conduit for generating a signal indicative of a concentration of product molecules(s) in the processed gas sample.

In some embodiments, the photolytic converter of the present invention is for converting $NO_2$ present in the gas sample into NO. In one embodiment, the receptacle comprises a NO detector means in communication with the reaction chamber outlet for generating a signal indicative of a concentration of NO in the processed gas sample.

In one embodiment, the conversion of the $NO_2$ to NO can be used as a zeroing scheme for existing $NO_2$ analyzers employing direct measurement technologies. This embodiment uses the converter to "remove" $NO_2$ from the sample, creating a zero background that can be used to calibrate and zero the instrument.

In some embodiments, an insulating covering is provided over the body of the photolytic converter to maintain a constant fluid sample temperature, preferably at the same measurement conditions within the measurement system.

In some embodiments, the photolytic converter is provided with one or more heat dissipating devices. Examples of such devices include heat sinks, thermoelectric cooling devices (such as Peltier coolers), fans, heat pipe systems, or water cooling systems.

In some embodiments, heat dissipating device(s) are connected or attached to the electromagnetic radiation source.

In some embodiments, wherein the converter body is housed in a housing, the housing comprises structural components to hold one or more heat dissipating devices. In some embodiments, the heat dissipation devices are integrated directly into the housing.

In some embodiments, at least one heat sink is mounted to the housing and located substantially close to the at least one electromagnetic radiation source.

In some embodiments, a heat sink and active cooling device are used in tandem.

The heat dissipation devices(s) can be attached to the housing by screws, or alternatively by other fasteners such as bolts, clamps, couplings or pins.

The heat sinks and housing can be comprised of a material with good heat transfer properties, such as aluminum.

In some embodiments, the heat dissipation device(s) is provided to maintain the electromagnetic source temperature at a temperature low enough such that the fluid sample does not thermally decompose other species in the gas sample (e.g. Peroxyacetal nitrate (PANs)), and/or low enough to extend the operational life of the electromagnetic sources based off of manufacturer recommended operating parameters, by dissipating the heat orthogonally to the heat transfer device, such as a heat sink with fan and/or water cooling, or through other means such as thermoelectrically with a Peltier cooler.

In some embodiments, there are additional cooling devices placed sufficiently close to and/or attached to the housing and/or to provide additional cooling for the converter body and/or the internals of the housing of the photolytic converter.

In some embodiments, the housing provides axial alignment of the center of the converter body, the electromagnetic light sources, and the heat dissipation device(s).

In some embodiments, the photolytic converter (with or without the housing) is placed within a chassis to provide an overall photolytic converter system.

The photolytic converter of the present invention can be configured to be used in conjunction, internally or externally, with an existing chemiluminescent analyzer.

In one embodiment, the photolytic converter of the present invention can be used as an alternative to existing thermal catalytic converters in current chemiluminescent analyzers to provide consumers with the added benefits of a photolysis converter without purchasing a new analyzer. The existing thermal converter can be disconnected, and the photolytic device can be connected in its stead to convert $NO_2$ to NO for measurement by the chemiluminescent analyzer. The converter of the present application can be provided with connection members configured to connect with the inlets and outlets of the existing thermal converter.

In accordance with another embodiment of the present invention there is provided a method of controlling back reactions or recombination reactions of product molecules formed in a dissociation reaction of reactant molecules of a fluid sample, the method comprising providing a converter as described above; introducing the fluid sample into the reaction chamber through one or more inflow conduits; initiating the dissociation reaction of the reactant molecules of the fluid sample in the reaction chamber to form the product molecules through exposure of the fluid sample to energy from an energy source, and conveying the fluid sample comprising the product molecules out from the reaction chamber through one or more outflow conduits.

To gain a better understanding of the invention described herein, the following examples are set forth. It will be understood that these examples are intended to describe illustrative embodiments of the invention and are not intended to limit the scope of the invention in any way.

EXAMPLES

FIG. 1 illustrates one example of the converter body 10 defining reaction chamber 12 having first end 12a and second end 12b. The converter body has one tangentially oriented inflow conduit 14 at end 12a, (having inlet 15 configured to communicate with a fluid source and outlet (not shown) in communication with reaction chamber 12), and an outflow conduit 16 having inlet 17 in communication with reaction chamber 12, wherein at least a portion 16a of the outflow conduit 16 extends into the reaction chamber, and an outlet (not shown) configured to be in communication with a receptacle for the processed fluid sample, and having axially oriented portion (extending from the axially oriented inlet 17) at the end 12b.

Figure 2:
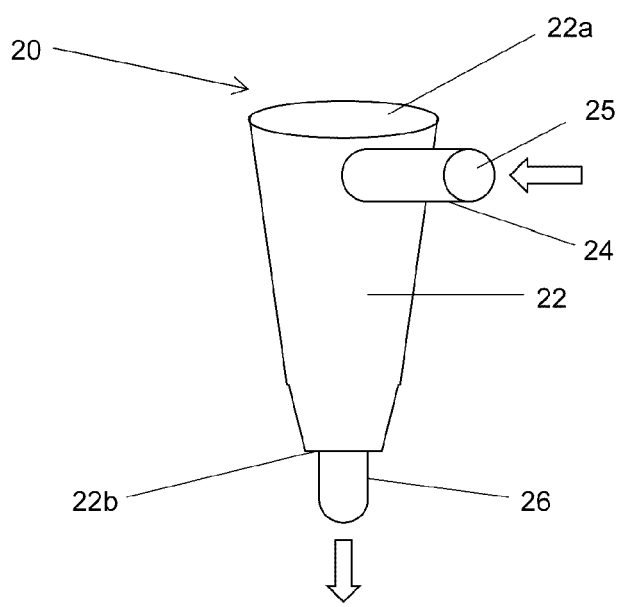
FIG. 2 illustrates a converter body in accordance with another embodiment of the photolytic converter of present invention.

FIG. 2 illustrates another embodiment of the converter body 20, which is conical in shape and defines reaction chamber 22 having first end 22a and second end 22b. In this embodiment, the converter body comprises at least one tangentially oriented inflow conduit 24 (having inlet 25) placed adjacent end 22a and an outflow conduit having an axially oriented portion extending from the axially oriented inlet, at the opposite end 22b.

Figure 3:
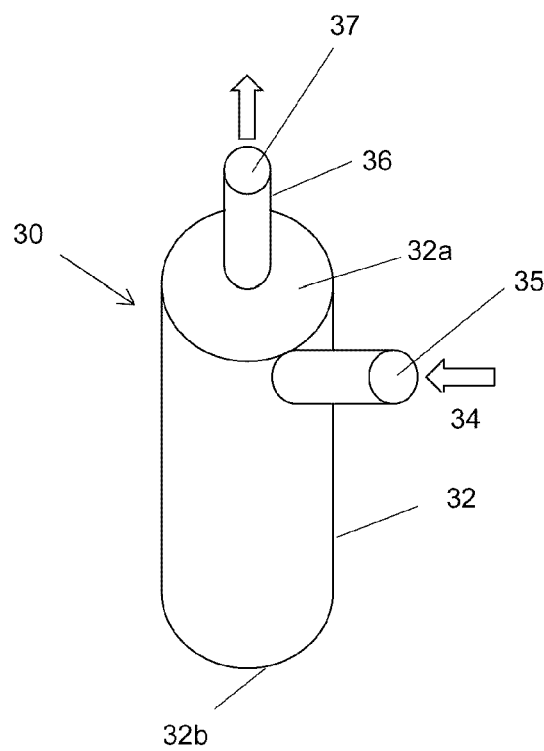
FIG. 3 illustrates a converter body in accordance with another embodiment of the photolytic converter of present invention.

FIG. 3 illustrates another embodiment of the converter body 30 defining reaction chamber 32 having first end 32a and second end 32b. In this embodiment, the tangentially oriented inflow conduit 34 (having inlet 35) is adjacent end 32a, and the outflow conduit having outlet 37, and an axially oriented portion extending from the axially oriented inlet is at the end 32a.

Figure 4:
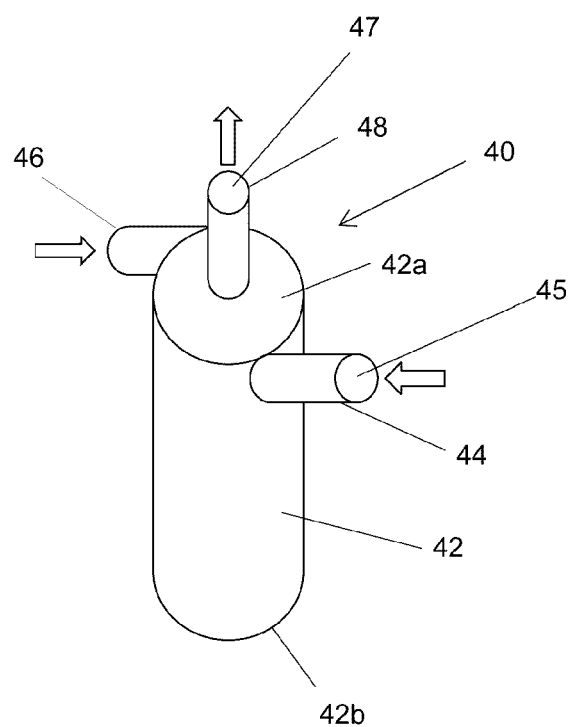
FIG. 4 illustrates a converter body in accordance with another embodiment of the photolytic converter of present invention.

FIG. 4 illustrates another embodiment of the converter body 40 defining reaction chamber 42 having first end 42a and second end 42b. In this embodiment, the converter body comprises two tangentially oriented inflow conduits 44 and 46 on opposite sides of the body close to end 42a, and has an outflow conduit 48 having outlet 47 and an axially oriented portion extending from the axially oriented inlet at end 42a.

Figure 5:
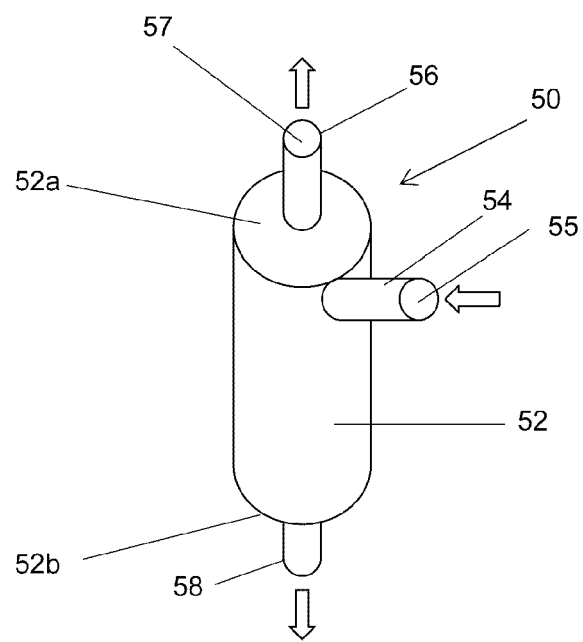
FIG. 5 illustrates a converter body accordance with another embodiment of the photolytic converter of present invention.

FIG. 5 illustrates another embodiment of the converter body 50 defining reaction chamber 52 having first end 52a and second end 52b. In this embodiment, the converter body comprises one tangentially oriented inflow conduit 54 (having inlet 55) on one side of the body close to end 52a, and has two outflow conduits 56 (having outlet 57) and 58 (outlet not shown) having axially oriented portions extending from the axially oriented inlets at opposite ends 52a and 52b, respectively.

Figure 6:
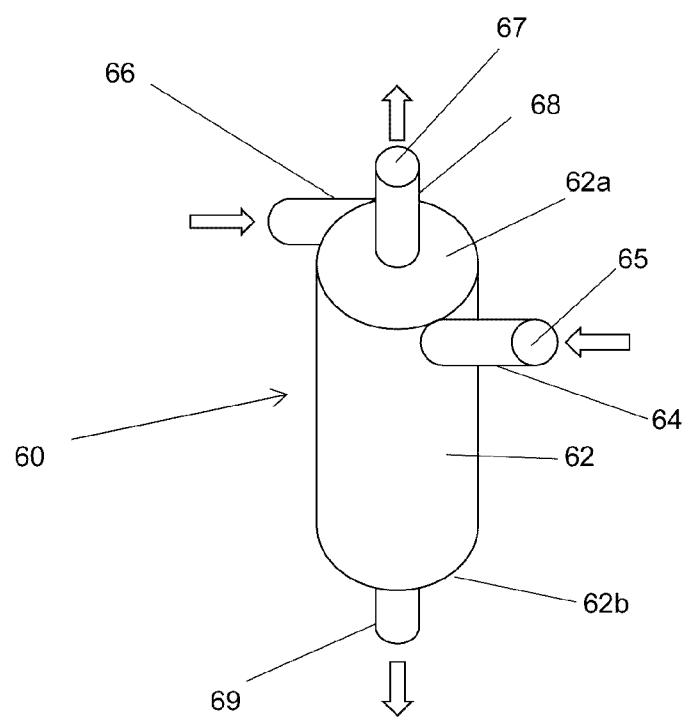
FIG. 6 illustrates a converter body in accordance with another embodiment of the photolytic converter of present invention.

FIG. 6 illustrates another embodiment of the converter body 60 defining reaction chamber 62 having first end 62a and second end 62b. In this embodiment, the converter body comprises two tangentially oriented inflow conduits 64 (having inlet 65) and 66 (inlet not shown) on opposite sides of the body, close to end 62a, and outflow conduits 68 (having outlet 67) and 69 (outlet not shown) having axially oriented portions extending from the axially oriented inlets at opposite ends 62a and 62b, respectively.

Figure 7:
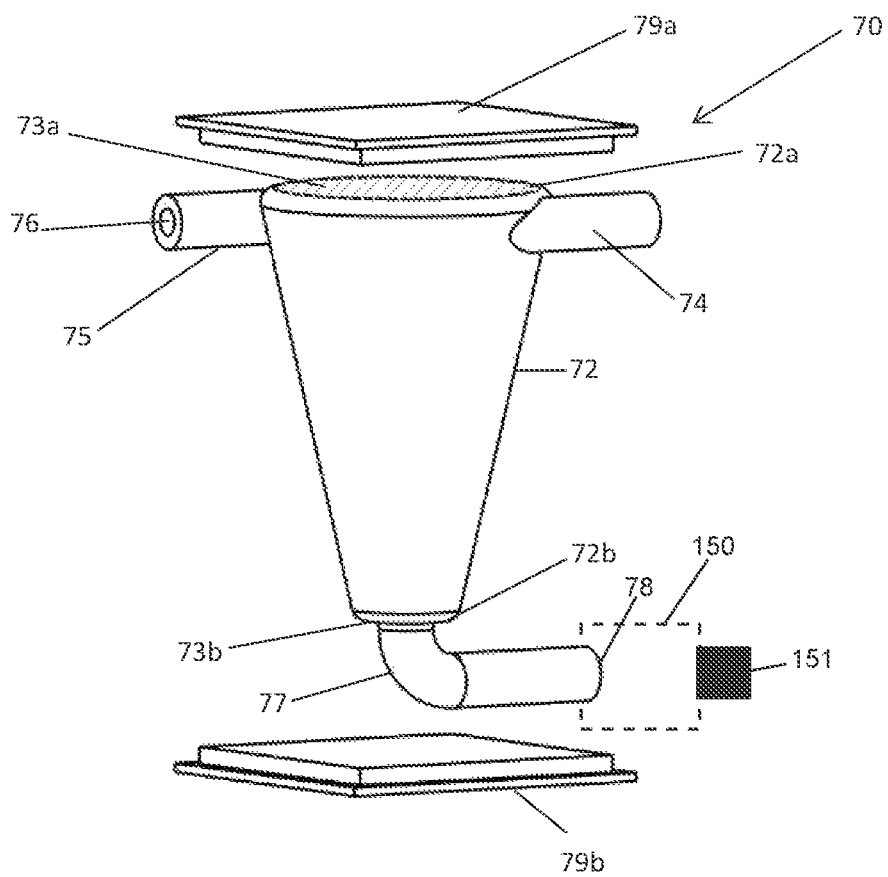
FIG. 7 illustrates a converter body in accordance with another embodiment of the photolytic converter of present invention, along with light source.

FIG. 7 illustrates another embodiment of the converter body 70 defining reaction chamber 72 having first end 72a and second end 72b. In this embodiment, UV transparent windows 73a and 73b are provided at both ends 72a and 72b, respectively, to receive the UV radiation from UV sources 79a and 7b, respectively. In this embodiment, the converter body is made of quartz, wherein the portions other than windows are coated with a reflective coating or covered with aluminum. The converter body further has tangentially oriented inflow conduits 74 (inlet not shown) and 75 (having inlet 76) (wherein the inlets are configured to communicate with a gas source), and having respective outlets (not shown) in communication with reaction chamber 72), and L-shaped outflow conduit 77 having an axially oriented inlet (not shown) in communication with reaction chamber 72 and outlet 78 configured to be in communication with a receptacle 150 for the processed gas sample. The receptacle 150 can have a NO measuring means 152, when the converter is for converting $NO_2$ present in a fluid sample into NO.

Figure 8:
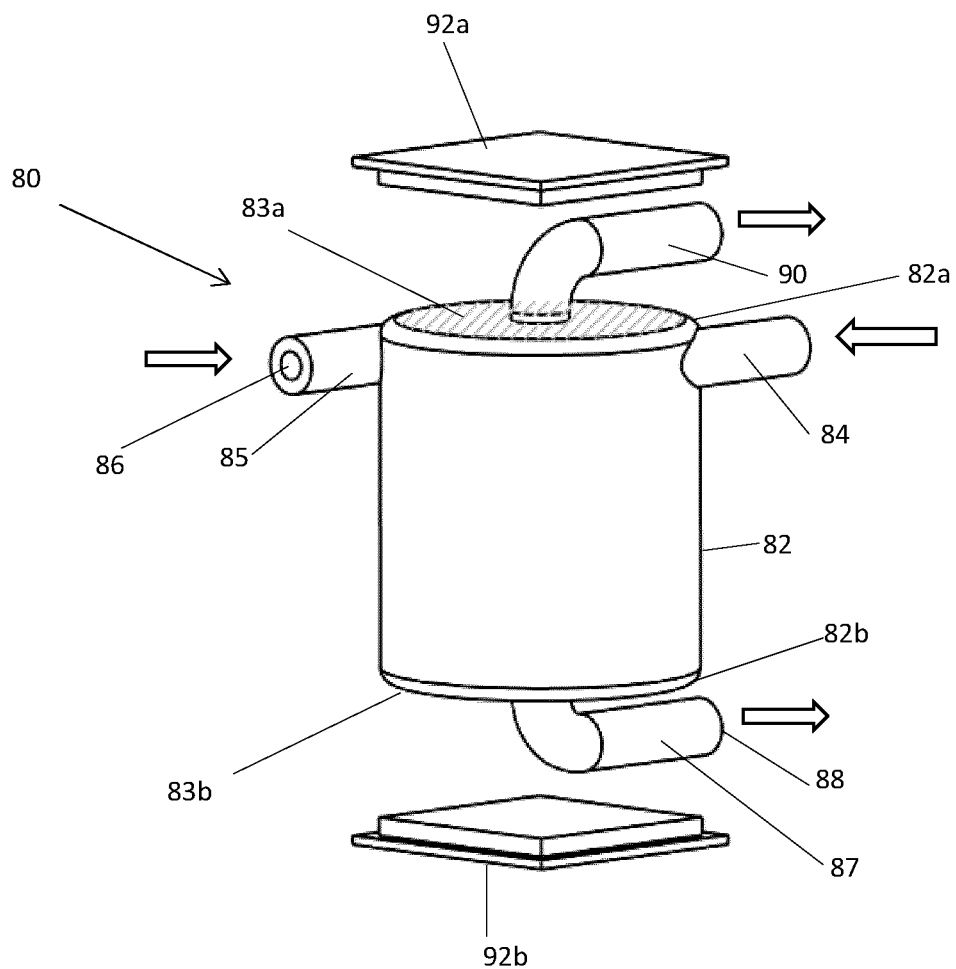
FIG. 8 illustrates a converter body in accordance with another embodiment of the photolytic converter of present invention, along with light source.

FIG. 8 illustrates another embodiment of the converter body 80 defining reaction chamber 82 having first end 82a and second end 82b. In this embodiment, UV transparent windows 83a and 83b are provided at both ends 82a and 82b, respectively, to receive the UV radiation from UV sources 92a and 92b, respectively. In this embodiment, the converter body is made of quartz, wherein the portions other than windows are coated with a reflective coating or covered with aluminum. The converter body further has tangentially oriented inflow conduits 84 (inlet not shown) and 84 (having inlet 86), respective outlets (not shown) in communication with reaction chamber 82), and L-shaped outflow conduits 86 and 87 having axially oriented inlets (not shown) in communication with reaction chamber 82 and outlets configured to be in communication with a receptacle for the processed gas sample.

FIG. 9 illustrates a top view of an embodiment of the photolytic converter placed inside a chassis 101 (forming part of photolytic converter system 100). The photolytic converter comprises a housing 102 enclosing converter body 104 defining reaction chamber 106, tangentially oriented inflow conduits 108 and 110 having inlets 110 and 111, and outlets 112 and 114, respectively, and an outflow conduit 116 having an axially oriented inlet 118 and outlet 120. The inflow conduits 108 and 110, each have portions 108a and 110a, respectively, extending into the reaction chamber 106. The LED modules 122a and 122b are provided inside the housing, such that electromagnetic radiation from the LED modules are in communication with the reaction chamber via windows 107a and 107b provided at the opposite ends of the converter body. The LED modules 122a and 122b are in thermal communication with the heatsinks 124a and 124b respectively, which in turn are attached to the walls of the housing.

The housing in this embodiment is made of metal, and has cut away window portions in the housing walls wherein the LEDs are located. The reaction chamber is aligned with structural elements of the housing such that the center of the reaction chamber is in line with the center of the LEDs. The LED light passes through the windows of the converter body and interacts with the sample fluid flowing through the chamber. Fans 126a and 126b are integrated with the heat sinks 124a and 124b, respectively to dissipate the heat in a direction orthogonal to the LEDs such that the heat from the LEDs is not blown across the reaction chamber and/or the housing.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

The scope of the claims should not be limited by the preferred embodiments set forth in the description, but should be given the broadest interpretation consistent with the description as a whole.

The invention claimed is:
1. A method of controlling back reactions or recombination reactions of product molecules formed in a photolytic dissociation reaction of reactant molecules of a gas sample, the method comprising:
  providing a photolytic converter comprising:
  a converter body defining a reaction chamber and having a central axis:
  one or more electromagnetic radiation sources in communication with the reaction chamber for dissociating the reactant molecules in the gas sample to form product molecules;
  one or more inflow conduits for conveying an unprocessed gas sample into the reaction chamber, each said inflow conduit having an inlet configured to be in fluid communication with a source of the gas sample and an outlet in communication with the reaction chamber,
  one or more outflow conduits for conveying a processed gas sample out of the reaction chamber, each said outflow conduit having an inlet in fluid communication with the reaction chamber and an outlet configured to be in fluid communication with a receptacle for receiving the processed gas sample,
  introducing the unprocessed gas sample into the reaction chamber through the one or more inflow conduits;
  initiating the dissociation reaction of the reactant molecules of the unprocessed gas sample in the reaction chamber by irradiation with the one or more electromagnetic radiation sources to form the product molecules;
  conveying the processed gas sample comprising the product molecules out of the reaction chamber through the one or more outflow conduits,
  wherein the outlet of the one or more inflow conduits are oriented tangentially with respect to the converter body, and wherein the inlet of the one or more outflow conduits is oriented axially with respect to the converter body, thereby creating a patterned flow of the gas sample in the reaction chamber to reduce disordered and/or turbulent mixing of the reactant molecules and/ or product molecules in the gas sample and controlling the back reactions or recombination reactions of product molecules.

2. The method of claim 1, wherein the patterned flow is helical flow or ordered flow of the gas sample in the reaction chamber.

3. The method of claim 1, wherein at least a portion of the one or more inflow conduits extend into the reaction chamber and/or at least a portion of the one or more outflow conduits extend into the reaction chamber.

4. The method of claim 1, wherein the converter body is elongated.

5. The method of claim 1, wherein the inner surface of the converter body has a reflective coating, and/or the outer surface of the converter body has a reflective coating, or a reflective covering.

6. The method of claim 5, wherein the reflective covering and the reflective covering has specular and/or diffuse reflective properties specific to the UV light spectrum.

7. The method of claim 1, wherein the one or more electromagnetic radiation source comprises a light-emitting diode (LED), LASER, and/or a gas discharge lamp.

8. The method of claim 1, further comprising a housing enclosing the converter body, wherein the one or more electromagnetic radiation sources are provided in the housing, and the converter body has one or more corresponding transparent windows, thereby allowing exposure of the radiation from the one or more electromagnetic radiation sources to the gas sample in the reaction chamber.

9. The method of claim 8, wherein the one or more electromagnetic radiation sources are in communication with the reaction chamber through one or more windows provided at one end or one side of the converter body and/or circumferentially around the body, or through one or more windows provided at opposite ends and/or opposite sides of the converter body.

10. The method of claim 8, wherein the housing comprises one or more heat dissipating devices.

11. The method of claim 1, wherein the converter body is made of metal and/or glass.

12. The method of claim 1, wherein the converter is for converting $NO_2$ present in the unprocessed gas sample into NO, wherein the receptacle has a NO detector means, in communication with the outflow conduit, for generating a signal indicative of a concentration of NO in the processed gas sample.

* * * * *